US008113225B2

(12) United States Patent  
Funari (10) Patent No.: US 8,113,225 B2  
(45) Date of Patent: Feb. 14, 2012

(54) FLUSH VALVE ACTUATOR FOR LOW-FLOW URINAL

(75) Inventor: Michael A. Funari, Apex, NC (US)

(73) Assignee: Zurn Industries, LLC, Erie, PA (US)

( * ) Notice: Subject to any disclaimer, the term of this patent is extended or adjusted under 35 U.S.C. 154(b) by 370 days.

(21) Appl. No.: 12/044,036

(22) Filed: Mar. 7, 2008

(65) Prior Publication Data

US 2008/0216896 A1     Sep. 11, 2008

Related U.S. Application Data

(60) Provisional application No. 60/905,354, filed on Mar. 7, 2007.

(51) Int. Cl.  
*E03D 5/10* (2006.01)  
*F16K 31/02* (2006.01)

(52) U.S. Cl. ............... 137/1; 137/624.11; 251/129.15; 4/305

(58) Field of Classification Search ......... 137/1, 624.11, 137/624.13; 251/129.15, 129.04; 4/305, 4/301  
See application file for complete search history.

(56) References Cited

U.S. PATENT DOCUMENTS

| | | | | |
|---|---|---|---|---|
| 3,916,947 A * | 11/1975 | Holmes et al. | ................. | 137/544 |
| 5,535,781 A * | 7/1996 | Paterson et al. | .......... | 137/624.11 |
| 6,019,343 A * | 2/2000 | Tsai | ........................... | 251/30.02 |
| 6,161,814 A * | 12/2000 | Jahrling | ................... | 251/129.04 |
| 6,499,152 B2 * | 12/2002 | Johnson | ................... | 251/129.04 |
| 7,143,992 B2 * | 12/2006 | Sassone et al. | ............ | 251/30.03 |
| 7,156,363 B2 * | 1/2007 | Parsons et al. | ............. | 251/30.04 |
| 7,325,566 B2 | 2/2008 | Marcichow et al. | | |
| 7,562,399 B2 * | 7/2009 | Parsons et al. | ............. | 251/30.01 |
| 7,594,519 B2 * | 9/2009 | Hart et al. | ....................... | 138/43 |
| 2005/0039248 A1 | 2/2005 | DeMarco | | |

* cited by examiner

Primary Examiner — Kevin Lee  
(74) Attorney, Agent, or Firm — The Webb Law Firm (57) ABSTRACT

A flush valve actuator includes a valve body having an inlet and an outlet and a passage therebetween. A diaphragm is disposed within the passage and is movable between two positions so as to control a flow of fluid between the inlet and the outlet. A variable flow control is positioned between the inlet and the diaphragm and adjusts a flow rate of fluid through the passage. A filter is positioned between the inlet and the variable flow control and removes debris from fluid flowing through the passage. A solenoid is activated for a certain time period so as to cause the diaphragm to move between the two positions. The flow rate and the activation time are defined so as to allow approximately one-eighth of a gallon of water to enter the outlet per activation of the solenoid.

26 Claims, 5 Drawing Sheets

FLUSH VALVE ACTUATOR FOR LOW-FLOW URINAL

CROSS REFERENCE TO RELATED APPLICATION

This application claims priority from U.S. Provisional Patent Application No. 60/905,354, filed Mar. 7, 2007, which is incorporated herein by reference.

BACKGROUND OF THE INVENTION

1. Field of the Invention

The present invention relates generally to a high efficiency flush valve actuator. More specifically, the present invention relates to a flush valve actuator capable of dispersing as little as one-eighth of a gallon of flush water to a urinal system regardless of the flow pressure of water as it is received from a water supply.

2. Description of Related Art

With increasing emphasis on water conservation, there is continuing interest in toilets and urinals designed to minimize the amount of water consumed in flushing and to mitigate excessive demand on both water supplies and wastewater disposal systems, both of which have tended to become overloaded with increasing population. Sanitation code requires urinals to provide a seal to contain gases and odors that develop in the drain system. This is conventionally performed by well-known P-traps or S-traps that create a seal using a residual portion of the flushing water to prevent gases and odors from escaping. The seal provides a barrier to seal odors from passing beyond the trap. The upward-facing liquid surface communicates freely with the user environment. Thus, the seal must be kept free from residual urine. This is accomplished by flushing a large enough volume of water to flush a sufficient amount of urine to prevent significant odor levels from being emitted from the upward-facing surface of the seal.

To meet these requirements, present flush valves and actuators emit approximately one gallon of water. However, with the recent threat of water shortage, a need for a new actuator or flush valve that emits less water has arisen.

SUMMARY OF THE INVENTION

The present invention addresses the need for water conservation by delivering as little as one-eighth of a gallon of water per flush. This is accomplished by using an actuator that delivers approximately one-eighth of a gallon of water to a urinal and trap system appropriately designed for flushing urine with approximately one-eighth of a gallon of water. The present invention uses variable flow control and a solenoid to control the amount of water emitted during a flush. The water is then emitted to a urinal where it gradually flows down the surface of the urinal, rinsing the urine towards the drain. Once the urine and water are drained, they pass through a trap that is designed to hold less than one-eighth of a gallon of water so that a sufficient amount of urine is flushed and the upward-facing liquid surface of the newly-formed seal does not emit significant odors.

According to an embodiment of the present invention, a flush valve actuator for a urinal is provided. The flush valve actuator includes a valve body having an inlet and an outlet and a passage defined therein, the passage being in communication with the inlet and the outlet; a diaphragm disposed within the passage of the valve body between the inlet and the outlet, the diaphragm being movable between a first position and a second position so as to control a flow of fluid between the inlet and the outlet; a variable flow control positioned within the passage between the inlet and the diaphragm, the variable flow control being adapted to adjust a flow rate of fluid through the passage to a defined flow rate; and a solenoid operatively associated with the valve body and the diaphragm, the solenoid being adapted to be activated for a defined activation period so as to cause the diaphragm to move from the first position to the second position. When in the first position, the diaphragm closes the passage so as to prevent the flow of fluid between the inlet and the outlet and when in the second position, the diaphragm allows fluid to flow from the passage to the outlet. The defined flow rate and the defined activation time are defined in a manner that allows at least approximately one-eighth of a gallon of water, and no more than approximately one gallon of water, to enter the outlet per activation of the solenoid. Preferably, the defined flow rate and the defined activation time are defined in a manner that allows approximately one-eighth of a gallon of water to enter the outlet per activation of the solenoid. The diaphragm is made from a flexible material.

The flush valve actuator further includes a casing. The casing includes a housing having an interior portion and a cover, the valve body and the solenoid being positioned within the interior portion of the housing.

The flush valve actuator further includes an electronics assembly electrically coupled to the solenoid. The electronics assembly activates the solenoid for the defined activation period. The electronics assembly activates the solenoid upon detection of a user's presence by a sensor.

The solenoid includes a cavity defined therein. The flush valve actuator further includes a plunger slidably disposed within the cavity in the solenoid, the plunger being adapted to engage an upward surface of the diaphragm, and a spring disposed in the cavity between the plunger and the solenoid, the spring being adapted to bias the plunger to a position extending from the cavity to engage the upward surface of the diaphragm so as to retain the diaphragm in the first position. During the defined activation period of the solenoid, the solenoid draws the plunger into the cavity so as to allow fluid pressure acting on a downward side of the diaphragm to move the diaphragm from the first position to the second position, and after the defined activation period, the plunger is returned to the position extending from the cavity under the bias of the spring so as to re-engage the upward side of the diaphragm to return the diaphragm to the first position. The valve body includes a valve seat and the diaphragm includes a downward surface, the downward surface being adapted to engage the valve seat so as to form a seal with the valve seat when the diaphragm is in the first position. The diaphragm further includes an upward surface and an opening extending between the downward surface and the upward surface, the opening being adapted to allow fluid from the passage to pass through the diaphragm into a diaphragm sealed cavity, defined between the upward surface of the diaphragm and the solenoid, so as to equalize fluid pressure on the upward and downward surfaces of the diaphragm, whereby the seal is formed between the downward side of the diaphragm and the valve seat. When the diaphragm is in the second position, the seal between the downward side of the diaphragm and the valve seat is broken such that fluid can flow between the passage and the outlet without passing through the diaphragm. When the diaphragm is in the second position, fluid is able to flow between the diaphragm sealed cavity and the outlet.

The flush valve actuator also includes a filter positioned within the passage between the inlet and the variable flow control, the filter being adapted to remove debris from fluid flowing through the passage and a filter cap attached to the filter. The filter cap threadably engages the valve body such that the filter and the filter cap are removable from the valve body.

According to a further embodiment of the present invention, a low-flow urinal device is provided. The low-flow urinal device includes a urinal system having a top surface and an open interior and a flush valve actuator mounted to the top surface of the urinal system and adapted to provide a volume of flushing water to the open interior of the urinal system. The flush valve actuator includes a valve body having an inlet and an outlet and a passage defined therein, the passage being in communication with the inlet and the outlet, the inlet being adapted to communicate with a water supply, the outlet being in communication with the open interior of the urinal system; a diaphragm disposed within the passage of the valve body between the inlet and the outlet, the diaphragm being movable between a first position and a second position so as to control a flow of fluid between the inlet and the outlet; a variable flow control positioned within the passage between the inlet and the diaphragm, the variable flow control being adapted to adjust a flow rate of fluid through the passage to a defined flow rate; and a solenoid operatively associated with the valve body and the diaphragm, the solenoid being adapted to be activated for a defined activation period so as to cause the diaphragm to move from the first position to the second position. When in the first position, the diaphragm closes the passage so as to prevent the flow of fluid between the inlet and the outlet and, when in the second position, the diaphragm allows fluid to flow from the passage to the outlet. The defined flow rate and the defined activation time are defined in a manner that allows at least approximately one-eighth of a gallon of flushing water and no more than approximately one gallon of flushing water to enter the open interior of the urinal system via the outlet per activation of the solenoid. Preferably, the defined flow rate and the defined activation time are defined in a manner that allows approximately one-eighth of a gallon of water to enter the outlet per activation of the solenoid. The diaphragm is made from a flexible material.

The flush valve actuator further includes a casing. The casing includes a housing having an interior portion and a cover, the valve body and the solenoid being positioned within the interior portion of the housing.

The flush valve actuator further includes an electronics assembly electrically coupled to the solenoid. The electronics assembly activates the solenoid for the defined activation period. The electronics assembly activates the solenoid upon detection of a user's presence by a sensor.

The solenoid includes a cavity defined therein. The flush valve actuator further includes a plunger slidably disposed within the cavity in the solenoid, the plunger being adapted to engage an upward surface of the diaphragm, and a spring disposed in the cavity between the plunger and the solenoid, the spring being adapted to bias the plunger to a position extending from the cavity to engage the upward surface of the diaphragm so as to retain the diaphragm in the first position. During the defined activation period of the solenoid, the solenoid draws the plunger into the cavity so as to allow fluid pressure acting on a downward side of the diaphragm to move the diaphragm from the first position to the second position, and after the defined activation period, the plunger is returned to the position extending from the cavity under the bias of the spring so as to re-engage the upward side of the diaphragm to return the diaphragm to the first position. The valve body includes a valve seat and the diaphragm includes a downward surface, the downward surface being adapted to engage the valve seat so as to form a seal with the valve seat when the diaphragm is in the first position. The diaphragm further includes an upward surface and an opening extending between the downward surface and the upward surface, the opening being adapted to allow fluid from the passage to pass through the diaphragm into a diaphragm sealed cavity defined between the upward surface of the diaphragm and the solenoid, so as to equalize fluid pressure on the upward and downward surfaces of the diaphragm, whereby the seal is formed between the downward side of the diaphragm and the valve seat. When the diaphragm is in the second position, the seal between the downward side of the diaphragm and the valve seat is broken such that fluid can flow between the passage and the outlet without passing through the diaphragm. When the diaphragm is in the second position, fluid is able to flow between the diaphragm sealed cavity and the outlet.

The flush valve actuator also includes a filter positioned within the passage between the inlet and the variable flow control, the filter being adapted to remove debris from fluid flowing through the passage and a filter cap attached to the filter. The filter cap threadably engages the valve body such that the filter and the filter cap are removable from the valve body.

In another aspect of the present invention, a method of providing a volume of flushing water to a urinal system having a top surface and an open interior is provided. The method includes the step of providing a flush valve actuator mounted to the top surface of the urinal system. The flush valve actuator includes a valve body having an inlet and an outlet and a passage defined therein, the passage being in communication with the inlet and the outlet, the inlet being adapted to communicate with a water supply, the outlet being in communication with the open interior of the urinal system; a diaphragm disposed within the passage of the valve body between the inlet and the outlet; a variable flow control positioned within the passage between the inlet and the diaphragm; and a solenoid operatively associated with the valve body and the diaphragm. The method further includes the steps of directing water from a water supply into the valve body via the inlet; adjusting a flow rate of the water to a defined flow rate with the variable flow control; activating the solenoid for a defined period of time so as to allow the diaphragm to move from a first position in which the diaphragm closes the passage to a second position in which the diaphragm allows the water to flow from the passage to the outlet; releasing a volume of flushing water from the passage into the open interior of the urinal system via the outlet; and de-activating the solenoid so as to return the diaphragm to the first position. The defined flow rate and the defined period of time are set so that the volume of flushing water released during the releasing step is at least approximately one-eighth of a gallon of water and no more than approximately one gallon of water. Preferably, the volume of flushing water released during the releasing step is approximately one-eighth of a gallon of water. The activating and de-activating steps are controlled by an electronics assembly electrically coupled to the solenoid, which performs the activating and de-activating steps upon detection of a user's presence by a sensor.

The method further includes the steps of providing a plunger slidably disposed within a cavity in the solenoid; providing a spring disposed in the cavity between the plunger and the solenoid; biasing the plunger to a position extending from the cavity with the spring; engaging an upward surface of the diaphragm with the plunger so as to retain the diaphragm in the first position; drawing the plunger into the cavity against the bias of the spring with the solenoid during the activating step so as to disengage the plunger from the upward surface of the diaphragm and allow the water in the passage to act on a downward side of the diaphragm to move the diaphragm to the second position; and re-engaging the upward surface of the diaphragm with the plunger after the de-activating step so as to return the diaphragm to the first position.

The method also includes the steps of filling a diaphragm sealed cavity between the upward surface of the diaphragm with water from the passage via an opening in the diaphragm so as to equalize fluid pressure acting on the upward and downward surfaces of the diaphragm; forming a seal between the downward surface of the diaphragm and a valve seat disposed in the valve body when the diaphragm is in the first position; releasing the water in the diaphragm sealed cavity to the outlet during the activating step; breaking the seal when the diaphragm is in the second position; allowing flush water to pass beneath the downward surface of the diaphragm directly to the outlet when the diaphragm is in the second position; re-filling the diaphragm sealed cavity when the diaphragm returns to the first position; and reforming the seal when the diaphragm returns to the first position.

The method further includes the steps of providing a filter positioned within the passage between the inlet and the variable flow control and removing debris from the water with the filter.

Further details and advantages of the invention will become clear upon reading the following detailed description in conjunction with the accompanying drawing figures, wherein like parts are designated with like reference numerals throughout.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
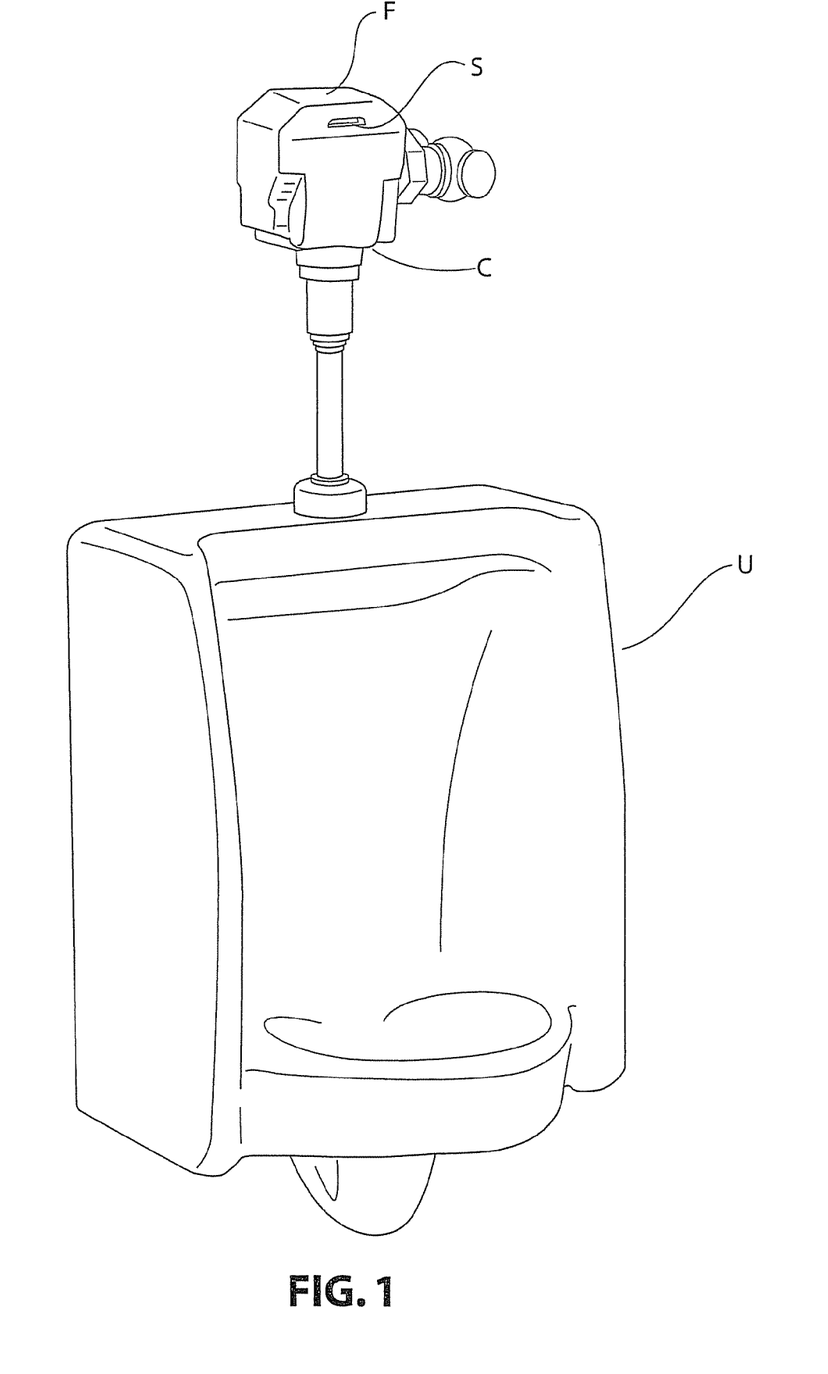
FIG. 1 depicts a perspective view of a urinal system according to an embodiment of the present invention.

With reference to FIG. 1, a perspective view of a urinal system U is provided, in accordance with a preferred embodiment of the present invention. A flush valve actuator F is disposed on a top surface of the urinal system U and is in fluid communication with a water supply (not shown) via an inlet 20 (shown in FIG. 4) and the open interior of the urinal system U via an outlet 21 (shown in FIG. 4). The flush valve actuator F includes an exterior casing C, and a sensor lens S is disposed within the casing C for detecting the presence of a user so as to trigger the flush valve actuator F to release a predetermined quantity of water, preferably approximately one-eighth of a gallon of water, from the water supply into the interior of the urinal system U. The urinal system U also includes a drain and a trap in communication with the drain and a sewage system.

Figure 2:
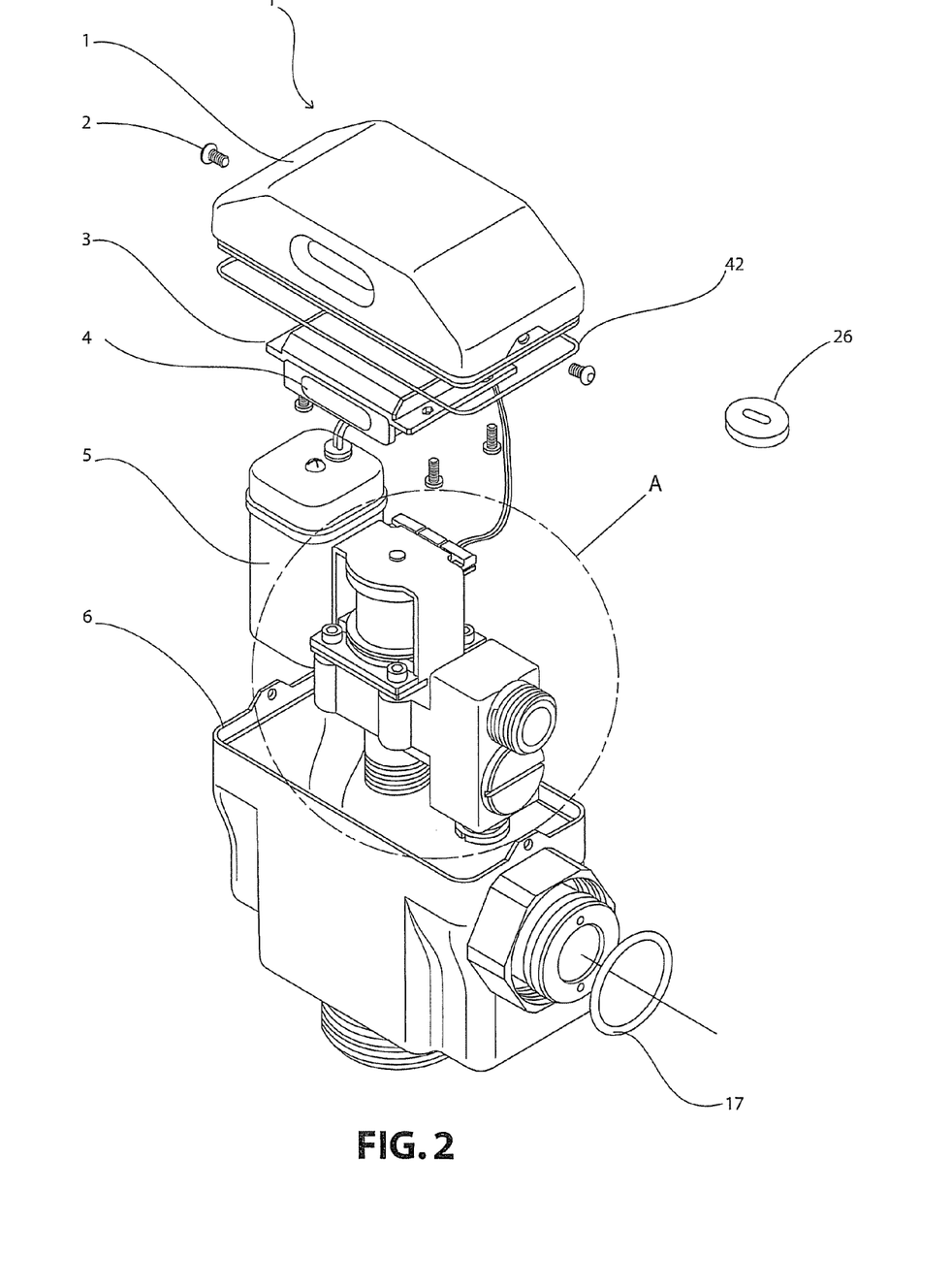
FIG. 2 depicts an exploded perspective view of a flush valve actuator for a urinal system according to an embodiment of the present invention.

With reference to FIG. 2, an exploded perspective view of the flush valve actuator F is provided. The flush valve actuator F includes a cover 1 at the top thereof. The cover 1 is attached to a housing 6 by screws 2. A rectangular gasket or O-ring 42 seals the connection between the cover 1 and the housing 6 to form the casing C for the flush valve actuator F. An electronics assembly 3 and lens assembly 4 are housed within an interior portion of the cover 1.

Lens assembly 4 includes a sensor lens S for detecting the presence of a user so as to trigger the flush valve actuator F to release a predetermined quantity of water. The construction and operation of such sensors are generally known to those of ordinary skill in the art and will not be discussed further.

The lens assembly 4 and electronics assembly 3 can be calibrated to change the detection range through the use of a calibration magnet 26 placed on a top surface of the cover 1 to trip an internal switch (not shown) in the electronics assembly 3 to put the flush valve actuator in a calibration mode. After tripping the internal switch with the calibration magnet 26, an operator stands a desired distance from the sensor lens S to reset the detection range.

Electronics assembly 3 is powered by one or more batteries 19 (shown in FIG. 4) housed in a battery tray 5 within the interior of housing 6 and electronically coupled to the electronics assembly. Alternatively, electronics assembly 3 may be hardwired to a building's electrical supply or other electric power sources can be coupled to the electronics assembly 3 to provide power thereto.

A gasket or O-ring 17 seals the connection between the housing 6 and a conduit that communicates the flush valve actuator F and the water supply.

Figure 3:
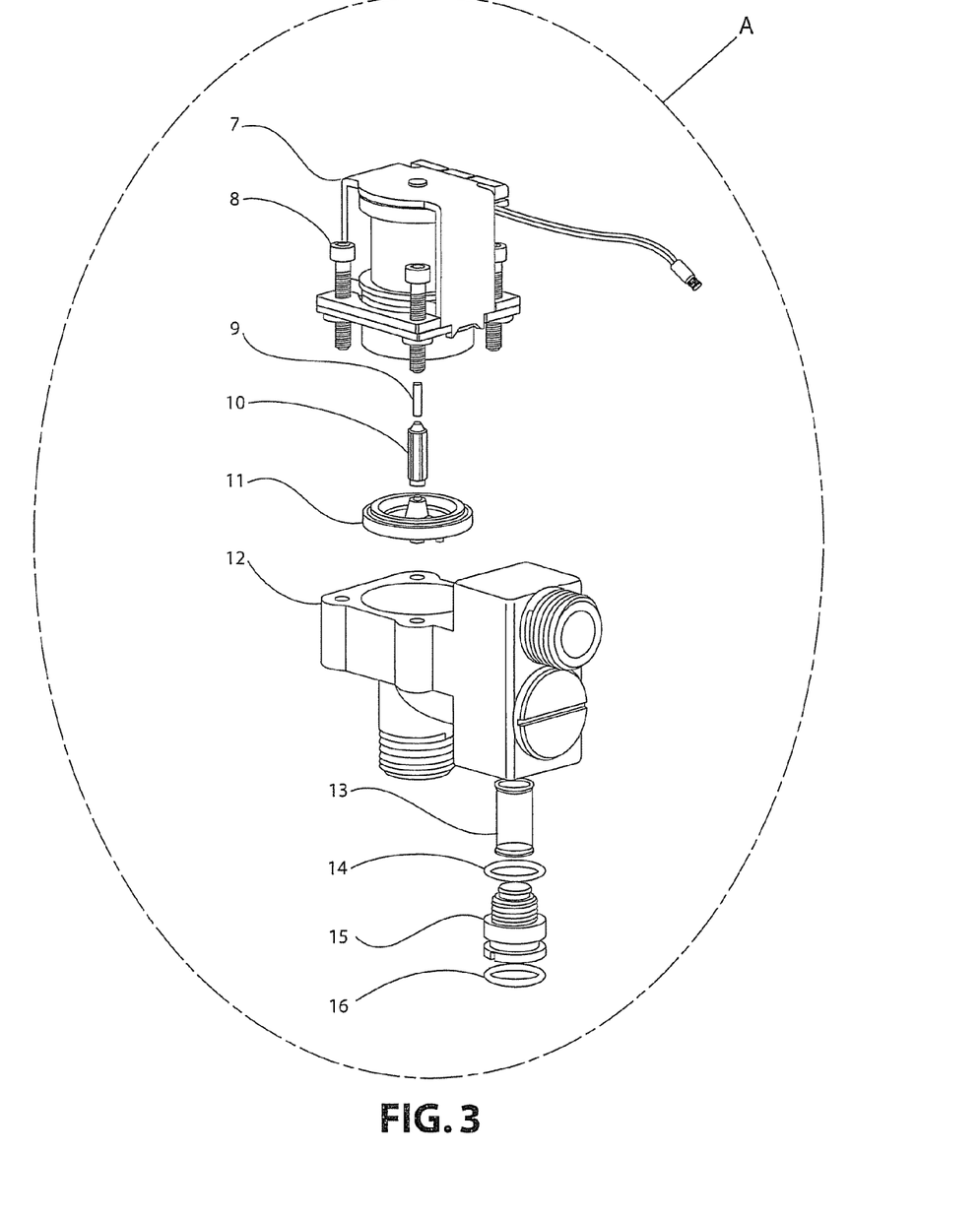
FIG. 3 depicts an exploded perspective view giving a more detailed view of area "A", shown in FIG. 2.

With reference to FIG. 3, a more detailed exploded perspective view of area "A" of the flush valve actuator F shown in FIG. 2 is provided. A solenoid 7 is disposed within the housing 6 of the flush actuator valve F and is attached to a valve body 12 by screws 8. A plunger 10 is disposed within a cavity in solenoid 7 and is slidable therein. Plunger 10 is biased in a downward direction with respect to the solenoid 7 by a spring 9. A flexible diaphragm 11 is disposed within the valve body 12 and is positioned to be engaged by the plunger 10 when the plunger 10 extends outward from the cavity within solenoid 7.

A filter 13 is also disposed within the valve body 12 in a cavity laterally displaced from the cavity in which the flexible diaphragm 11 is received and is accessible from the bottom of the valve body 12. Filter 13 is attached to the valve body 12 by a filter cap 15, which threadably engages the valve body 12. The connection between the filter cap 15 and the valve body 12 is sealed by a pair of gaskets or O-rings 14, 16 disposed at the top and bottom of the filter cap 15, respectively. The filter 13 and filter cap 15 are removable from the valve body 12 by a slot head screwdriver so that the filter 13 can be replaced or cleaned with water and a soft brush.

Figure 4:
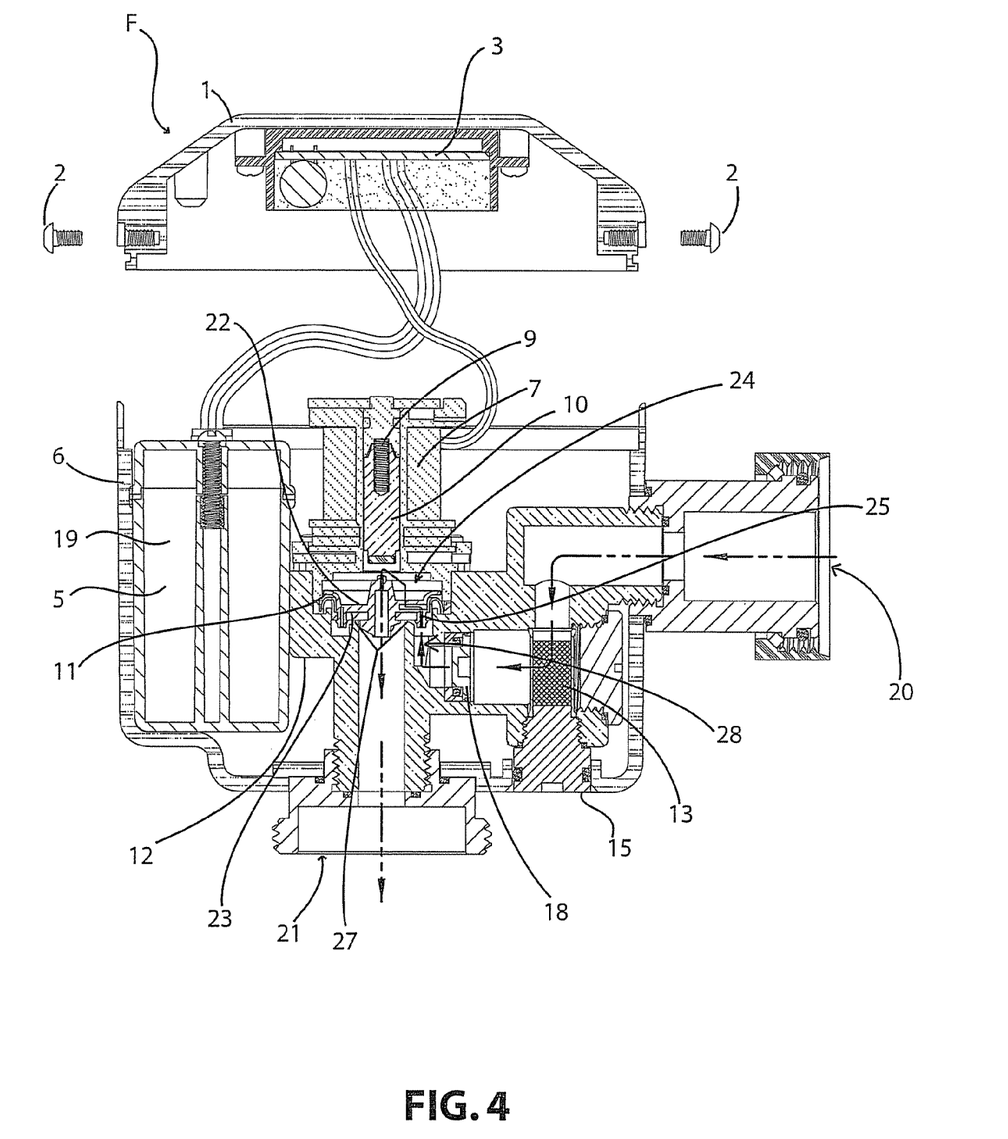
FIG. 4 depicts a front sectional view of the flush valve actuator according to an embodiment of the present invention.

With reference to FIG. 4, a detailed front sectional view of the flush valve actuator F is provided. The flush valve actuator F includes a flexible diaphragm 11 having an upward side 22 and a downward side 23. Above the upward side 22 of the flexible diaphragm 11 is a diaphragm sealed cavity 24 defined within the valve body 12 between the flexible diaphragm 11 and the solenoid 7. The downward side 23 of the flexible diaphragm 11 acts as a sealing surface. The flexible diaphragm has an opening 25, extending through the diaphragm 11, which connects the diaphragm sealed cavity 24 to a passage 28 between the flexible diaphragm and a variable flow control 18.

Above the upward side 22 of the flexible diaphragm 11 is a solenoid 7. A plunger 10 is slidably disposed within a cavity in the solenoid 7. Plunger 10 is biased in a downward direction with respect to the solenoid by a spring 9. Solenoid 7 is electrically coupled to the electronics assembly 3 so as to be activated and deactivated by the electronics assembly 3. When the solenoid 7 is in a resting or deactivated state, spring 9 biases plunger 10 in a downward direction to engage and exert a force upon the upward side 22 of the diaphragm 11. As a result of this force, the downward side 23 of the diaphragm 11 contacts a valve seat 27 in a manner that creates a seal between the downward side 23 and the valve seat 27.

Upon activation of the electronics assembly 3, the solenoid 7 is activated, which, in turn, draws the plunger 10 within the cavity of the solenoid 7 so as to release a sufficient amount of force applied by the plunger 10 to allow fluid pressure acting on the downward side 23 of the flexible diaphragm 11 to move the diaphragm 11 in an upward direction. As a result, the seal between the valve seat 27 and the downward side 23 of the diaphragm 11 is broken. This action fluidly couples the diaphragm sealed cavity 24 with the outlet 21 of the valve body 12, thus allowing fluid in the diaphragm sealed cavity 24 to pass into the outlet 21. It also connects the passage 28 between the diaphragm 11 and the variable flow control 18 to the outlet 21, allowing fluid that passes through the variable flow control 18 to directly pass into the outlet 21 without passing into the diaphragm sealed cavity 24. The solenoid 7 is set to remain active for a defined period of time, and will return to a resting or deactivated state after the expiration of that defined period of time, after which, the plunger 10 will be released by the solenoid so as to exert force on the diaphragm 11. Fluid pressure will then equalize on the upward side 22 of the diaphragm 11 and portions of the downward side 23 of the diaphragm, thereby causing the diaphragm 11 to seal on its downward side 23 with the valve seat 27.

The variable flow control 18 maintains a defined rate of flow for a fluid independent from pressure variations at the inlet 20, which is in fluid communication with the water supply. Preferably, the fluid pressure in the inlet 20 is between 20 psi and 80 psi. A fluid at varying pressures enters the flush valve actuator F at the inlet 20. It passes through a filter 13 that removes debris from the fluid so as to prevent damage and clogging of the variable flow control 18 and flexible diaphragm 11. The variable flow control 18 adjusts the flow rate of the fluid to a defined flow rate, irrespective of the fluid pressure. The defined flow rate and the defined period of time that the solenoid 7 remains active are set in a manner to allow a defined volume of water to enter the outlet 21 per activation of the solenoid 7. Preferably, the defined volume of water is at least one-eighth of a gallon and less than one gallon of water. More preferably, the defined volume of water is approximately one-eighth of a gallon.

Figure 5A:
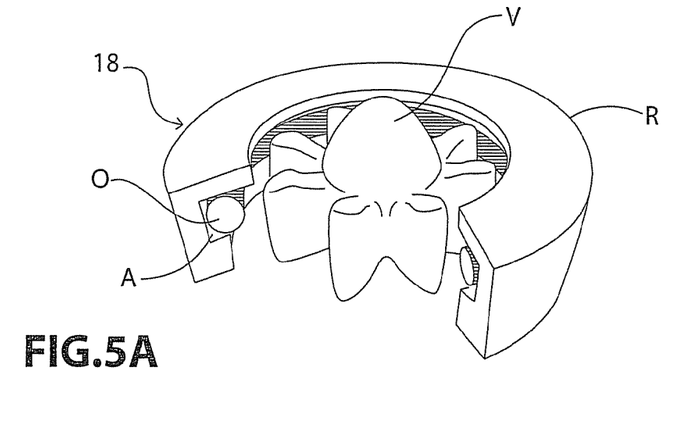
FIGS. 5A, 5B and 5C depict perspective views of a representative variable flow control employed in the present invention.
Figure 5B:
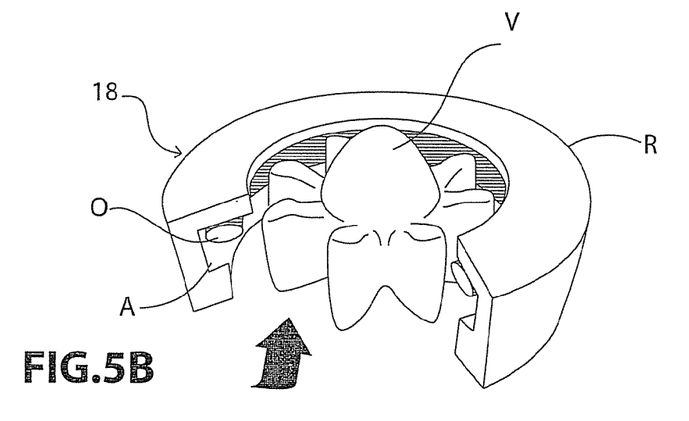
Figure 5C:
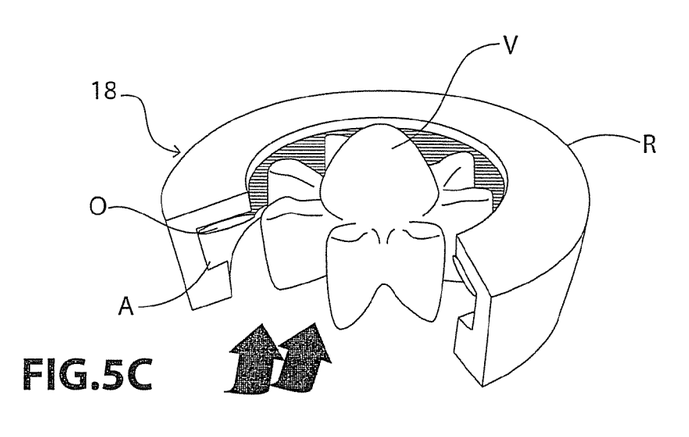

With reference to FIGS. 5A-5C perspective views of a representative variable flow control 18 employed in the present invention are provided at different flow pressures. The variable flow control 18 employed in the present invention is manufactured by NEOPERL®. Such controls are described on the NEOPERL® website at [[www.neoperl.com/products/flowregulators/default.asp]] and related links, which is hereby incorporated by reference. The variable flow control 18 includes a ring R definig an annulus A. An O-ring O is received in the annulus A as well as a vane member V, defining a vaned passageway through the annulus A of the ring R. As the pressure drops or increases across the variable flow control, the O-ring O compresses so as to restrict the flow path through the variable flow control 18, so that the fluid flow remains approximately constant, irrespective of the operating pressure of the system.

As shown in FIG. 5A, during static conditions when no flow pressure is applied against the variable flow control 18, the O-ring O is relaxed and the flow path about the vane member V is completely open. As shown in FIG. 5B, during normal conditions when fluid flow is applied against the variable flow control 18 at normal pressures (indicated by a single solid arrow leading into the variable flow control 18), the O-ring O is subjected to the flow pressure so as to be compressed into a seating area within the annulus A of the ring R, which reduces the size of the passage about the vane member V so as to restrict fluid flow through the ring R. As shown in FIG. 5C, when fluid flow is applied against the variable flow control 18 at high pressures (indicated by two solid arrows leading into the variable flow control 18), the O-ring O is subject to the flow pressure so as to be further compressed into the seating area within the annulus A of the ring R, which further reduces the size of the passage about the vane member V. As the pressure decreases, the O-ring O relaxes and the passage about the vane member V re-opens to a state depicted in FIG. 5A or 5B.

According to the preferred embodiment depicted in FIGS. 1-4, water having a pressure between 20 psi and 80 psi enters the flush valve actuator F at the inlet 20. The water passes through a filter 13 that removes debris and then enters the variable flow control 18. The variable flow control 18 adjusts the flow rate of the water to a defined flow rate irrespective of the water pressure at the inlet 20. After the water passes through the variable flow control 18, it encounters the flexible diaphragm 11. The diaphragm 11 is controlled by the plunger 10, which is slidably disposed within a solenoid 7. When the solenoid 7 is in a resting or deactivated state, the plunger 10 applies pressure to the diaphragm 11 in a manner that creates a seal between the downward side 23 of the diaphragm 11 and the valve seat 27.

When the electronics assembly 3 activates the solenoid 7, the pressure applied by the plunger 10 onto the diaphragm 11 is sufficiently released, whereby the diaphragm 11 is pushed by the water pressure acting on the downward side 23, which breaks the seal between the downward side 23 of the diaphragm 11 and the valve seat 27. The water in the diaphragm sealed cavity 24 is released into the outlet 21, and the water that has passed through the variable flow control 18 flows directly into the outlet 21 without passing through the diaphragm sealed cavity 24. During the time that the seal is broken, a defined volume of water flows into the outlet 21, preferably approximately one-eighth of a gallon of water.

After the expiration of a defined period of time, the solenoid 7 is returned to a resting state, thereby causing the plunger 10 to exert force on the upward side 22 of the diaphragm 11. Water begins to pass through an opening 25 in the diaphragm 11 and collects in the diaphragm sealed cavity 24 until the cavity 24 is filled. This causes a seal to form between the downward side 23 of the diaphragm 11 and the valve seat 27. Once the seal is re-formed, water can no longer pass between the diaphragm 11 and the valve seat 27 until the solenoid 7 is activated again.

Because such a low volume of water is passed through the flush valve actuator F per activation of the solenoid 7, preferably approximately one-eighth of a gallon, accuracy in controlling the flow of water through the flush valve actuator F is important in order to avoid unnecessary use of water as well as to ensure that a sufficient amount of water passes through the urinal trap in order to adequately flush away waste. Close tolerances in controlling the amount of water passed through the flush valve actuator F with a very small standard deviation in flush volume are required in order to ensure that approximately one-eighth of a gallon of water is released by the flush valve actuator F per activation of the solenoid 7. Solenoid 7 and variable flow control 18 operate in tandem to achieve the required accuracy and closer tolerances necessary to achieve consistent low volume flushing. Solenoid 7 controls the timing of the flush valve actuator F to a high degree of accuracy. Further, variable flow control 18 operates to accurately control the flow rate and pressure of water passing through the flush valve actuator F by constricting the flow of water through the flush valve actuator F according to the flow pressure of the water as it is received from the water supply. Filter 13 operates to remove large debris from the water so as to prevent damage to the other components of the flush valve actuator F, prevent leakage and to ensure that debris will not interfere with the accurate operation of the flush valve actuator F.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A flush valve actuator for a urinal, said flush valve actuator comprising:
   a valve body having an inlet and an outlet and a passage defined therein, said passage being in communication with said inlet and said outlet;
   a diaphragm disposed within said passage of said valve body between said inlet and said outlet, said diaphragm being movable between a first position and a second position so as to control a flow of fluid between said inlet and said outlet;
   a variable flow control positioned within said passage between said inlet and said diaphragm, said variable flow control being adapted to adjust a flow rate of fluid through said passage to a defined flow rate;
   a solenoid operatively associated with said valve body and said diaphragm, said solenoid being adapted to be activated for a defined activation period so as to cause said diaphragm to move from said first position to said second position; and
   an electronics assembly electrically coupled to said solenoid, wherein said electronics assembly activates said solenoid for the defined activation period,
   wherein when in said first position, said diaphragm closes said passage so as to prevent the flow of fluid between said inlet and said outlet and, when in said second position, said diaphragm allows fluid to flow from said passage to said outlet,
   wherein the defined flow rate and the defined activation period are defined in a manner that allows approximately one-eighth of a gallon of water to enter said outlet per activation of said solenoid, and
   wherein said electronics assembly activates said solenoid upon detection of a user's presence by a sensor.

2. The flush valve actuator according to claim 1, further comprising a casing, said casing including a housing having an interior portion and a cover, said valve body and said solenoid being positioned within said interior portion of said housing.

3. The flush valve actuator according to claim 1, wherein said solenoid includes a cavity defined therein.

4. The flush valve actuator according to claim 3, further comprising:
   a plunger slidably disposed within said cavity in said solenoid, said plunger being adapted to engage an upward surface of said diaphragm; and
   a spring disposed in said cavity between said plunger and said solenoid, said spring being adapted to bias said plunger to a position extending from said cavity to engage said upward surface of said diaphragm so as to retain said diaphragm in said first position,
   wherein during the defined activation period of said solenoid, said solenoid draws said plunger into said cavity so as to allow fluid pressure acting on a downward side of said diaphragm to move said diaphragm from said first position to said second position, and after the defined activation period, said plunger is returned to said position extending from said cavity under the bias of said spring so as to re-engage said upward side of said diaphragm to return said diaphragm to said first position.

5. The flush valve actuator according to claim 1, wherein said valve body includes a valve seat and said diaphragm includes a downward surface, said downward surface being adapted to engage said valve seat so as to form a seal with said valve seat when said diaphragm is in said first position.

6. The flush valve actuator according to claim 5, wherein said diaphragm further includes an upward surface and an opening extending between said downward surface and said upward surface, said opening being adapted to allow fluid from said passage to pass through said diaphragm into a diaphragm sealed cavity defined between said upward surface of said diaphragm and said solenoid, so as to equalize fluid pressure on said upward and downward surfaces of said diaphragm, whereby the seal is formed between said downward side of said diaphragm and said valve seat.

7. The flush valve actuator according to claim 6, wherein, when said diaphragm is in said second position, the seal between said downward side of said diaphragm and said valve seat is broken such that fluid can flow between said passage and said outlet without passing through said diaphragm.

8. The flush valve actuator according to claim 6, wherein, when said diaphragm is in said second position, fluid is able to flow between said diaphragm sealed cavity and said outlet.

9. The flush valve actuator according to claim 1, further comprising a filter positioned within said passage between said inlet and said variable flow control, said filter being adapted to remove debris from fluid flowing through said passage.

10. The flush valve actuator according to claim 9, further comprising a filter cap attached to said filter, said filter cap threadably engaging said valve body such that said filter and said filter cap are removable from said valve body.

11. The flush valve actuator according to claim 1, wherein said diaphragm is made from a flexible material.

12. A low-flow urinal device comprising:
   a urinal system having a top surface and an open interior;
   a flush valve actuator mounted to said top surface of said urinal system and adapted to provide a volume of flushing water to said open interior of said urinal system, wherein said flush valve actuator comprises:
   a valve body having an inlet and an outlet and a passage defined therein, said passage being in communication with said inlet and said outlet, said inlet being adapted to communicate with a water supply, said outlet being in communication with said open interior of said urinal system;

a diaphragm disposed within said passage of said valve body between said inlet and said outlet, said diaphragm being movable between a first position and a second position so as to control a flow of fluid between said inlet and said outlet;

a variable flow control positioned within said passage between said inlet and said diaphragm, said variable flow control being adapted to adjust a flow rate of fluid through said passage to a defined flow rate; and a solenoid operatively associated with said valve body and said diaphragm, said solenoid being adapted to be activated for a defined activation period so as to cause said diaphragm to move from said first position to said second position, wherein when in said first position, said diaphragm closes said passage so as to prevent the flow of fluid between said inlet and said outlet and, when in said second position, said diaphragm allows fluid to flow from said passage to said outlet, wherein the defined flow rate and the defined activation period are defined in a manner that allows approximately one-eighth of a gallon of flushing water to enter said open interior of said urinal system via said outlet per activation of said solenoid, wherein said flush valve actuator further comprises an electronics assembly electrically coupled to said solenoid, wherein said electronics assembly activates said solenoid for the defined activation period, and wherein said electronics assembly activates said solenoid upon detection of a user's presence by a sensor.

13. The low-flow urinal device according to claim 12, wherein said flush valve actuator further comprises a casing, said casing including a housing having an interior portion and a cover, said valve body and said solenoid being positioned within said interior portion of said housing.

14. The low-flow urinal device according to claim 12, wherein said solenoid includes a cavity defined therein.

15. The low-flow urinal device according to claim 14, wherein said flush valve actuator further comprises:

a plunger slidably disposed within said cavity in said solenoid, said plunger being adapted to engage an upward surface of said diaphragm; and a spring disposed in said cavity between said plunger and said solenoid, said spring being adapted to bias said plunger to a position extending from said cavity to engage said upward surface of said diaphragm so as to retain said diaphragm in said first position, wherein during the defined activation period of said solenoid, said solenoid draws said plunger into said cavity so as to allow fluid pressure acting on a downward side of said diaphragm to move said diaphragm from said first position to said second position, and after the defined activation period, said plunger is returned to said position extending from said cavity under the bias of said spring so as to re-engage said upward side of said diaphragm to return said diaphragm to said first position.

16. The low-flow urinal device according to claim 12, wherein said valve body includes a valve seat and said diaphragm includes a downward surface, said downward surface being adapted to engage said valve seat so as to form a seal with said valve seat when said diaphragm is in said first position.

17. The low-flow urinal device according to claim 16, wherein said diaphragm further includes an upward surface and an opening extending between said downward surface and said upward surface, said opening being adapted to allow fluid from said passage to pass through said diaphragm into a diaphragm sealed cavity defined between said upward surface of said diaphragm and said solenoid, so as to equalize fluid pressure on said upward and downward surfaces of said diaphragm, whereby the seal is formed between said downward side of said diaphragm and said valve seat.

18. The low-flow urinal device according to claim 17, wherein, when said diaphragm is in said second position, the seal between said downward side of said diaphragm and said valve seat is broken such that fluid can flow between said passage and said outlet without passing through said diaphragm.

19. The low-flow urinal device according to claim 17, wherein, when said diaphragm is in said second position, fluid is able to flow between said diaphragm sealed cavity and said outlet.

20. The low-flow urinal device according to claim 12, wherein said flush valve actuator further comprises a filter positioned within said passage between said inlet and said variable flow control, said filter being adapted to remove debris from fluid flowing through said passage.

21. The low-flow urinal device according to claim 20, wherein said flush valve actuator further comprises a filter cap attached to said filter, said filter cap threadably engaging said valve body such that said filter and said filter cap are removable from said valve body.

22. The low-flow urinal device according to claim 12, wherein said diaphragm is made from a flexible material.

23. A method of providing a volume of flushing water to a urinal system having a top surface and an open interior, said method comprising the steps of:

providing a flush valve actuator mounted to the top surface of the urinal system, said flush valve actuator including:

a valve body having an inlet and an outlet and a passage defined therein, said passage being in communication with said inlet and said outlet, said inlet being adapted to communicate with a water supply, said outlet being in communication with the open interior of the urinal system;

a diaphragm disposed within said passage of said valve body between said inlet and said outlet;

a variable flow control positioned within said passage between said inlet and said diaphragm; and a solenoid operatively associated with said valve body and said diaphragm;

directing water from a water supply into said valve body via said inlet;

adjusting a flow rate of the water to a defined flow rate with said variable flow control;

activating said solenoid for a defined period of time so as to allow said diaphragm to move from a first position in which said diaphragm closes said passage to a second position in which said diaphragm allows the water to flow from said passage to said outlet;

releasing a volume of flushing water from said passage into the open interior of the urinal system via said outlet; and de-activating said solenoid so as to return said diaphragm to said first position, wherein the volume of flushing water released during said releasing step is approximately one-eighth of a gallon of water, wherein said activating and de-activating steps are controlled by an electronics assembly electrically coupled to said solenoid, and wherein said electronics assembly performs said activating and de-activating steps upon detection of a user's presence by a sensor.

24. The method according to claim 23, further comprising the steps of:
providing a plunger slidably disposed within a cavity in said solenoid;
providing a spring disposed in said cavity between said plunger and said solenoid;
biasing said plunger to a position extending from said cavity with said spring;
engaging an upward surface of said diaphragm with said plunger so as to retain said diaphragm in said first position;
drawing said plunger into said cavity against the bias of said spring with said solenoid during said activating step so as to disengage said plunger from said upward surface of said diaphragm and allow the water in said passage to act on a downward side of said diaphragm to move said diaphragm to said second position; and
re-engaging said upward surface of said diaphragm with said plunger after said de-activating step so as to return said diaphragm to said first position.

25. The method according to claim 23, further comprising the steps of:
filling a diaphragm sealed cavity between said upward surface of said diaphragm with water from said passage via an opening in said diaphragm so as to equalize fluid pressure acting on said upward and downward surfaces of said diaphragm;
forming a seal between said downward surface of said diaphragm and a valve seat disposed in said valve body when said diaphragm is in said first position;
releasing the water in said diaphragm sealed cavity to said outlet during said activating step;
breaking said seal when said diaphragm is in said second position;
allowing flush water to pass beneath said downward surface of said diaphragm directly to said outlet when said diaphragm is in said second position;
re-filling said diaphragm sealed cavity when said diaphragm returns to said first position; and
re-forming said seal when said diaphragm returns to said first position.

26. The method according to claim 23, further comprising the steps of
providing a filter positioned within said passage between said inlet and said variable flow control; and
removing debris from the water with said filter.

* * * * *

UNITED STATES PATENT AND TRADEMARK OFFICE
CERTIFICATE OF CORRECTION

Page 1 of 1

PATENT NO.         : 8,113,225 B2
APPLICATION NO.    : 12/044036
DATED              : February 14, 2012
INVENTOR(S)        : Michael A. Funari It is certified that error appears in the above-identified patent and that said Letters Patent is hereby corrected as shown below:

Column 14, Line 23, Claim 26, after "steps of" insert -- : --

Signed and Sealed this
Twenty-fourth Day of April, 2012

David J. Kappos
*Director of the United States Patent and Trademark Office*